United States Patent [19]

Osada et al.

[11] Patent Number: 5,070,230
[45] Date of Patent: Dec. 3, 1991

[54] ELECTRICALLY HEATABLE WINDSHIELD

[75] Inventors: Koichi Osada; Hisashi Nishiyama; Akira Hirano, all of Yokohama, Japan

[73] Assignee: Asahi Glass Company Ltd., Tokyo, Japan

[21] Appl. No.: 501,867

[22] Filed: Mar. 29, 1990

[30] Foreign Application Priority Data

Mar. 31, 1989 [JP] Japan .................................. 36270[U]
Oct. 9, 1989 [JP] Japan ................................ 117961[U]

[51] Int. Cl.$^5$ ............................................... H05B 3/26
[52] U.S. Cl. ..................................... 219/203; 219/547; 219/543; 338/309; 52/171
[58] Field of Search ............... 219/203, 522, 543, 547, 219/541; 338/309, 308, 328, 327; 52/171; 428/594, 632, 633

[56] References Cited

U.S. PATENT DOCUMENTS

| RE. 33,297 | 8/1990 | Ramus et al. | 65/42 |
| 4,625,070 | 11/1986 | Berman et al. | 136/249 |
| 4,654,067 | 3/1987 | Ramus et al. | 65/60.5 |
| 4,686,321 | 8/1987 | Kishi | 136/244 |
| 4,717,790 | 1/1988 | Guchermann | 136/251 |
| 4,725,710 | 2/1988 | Ramus et al. | 219/203 |
| 4,744,844 | 5/1988 | Hurst | 156/101 |
| 4,778,732 | 10/1988 | Hasegawa et al. | 428/630 |
| 4,786,784 | 11/1988 | Nikodem et al. | 219/543 |
| 4,820,902 | 4/1989 | Gillery | 219/203 |
| 4,918,288 | 4/1990 | Carter et al. | 219/203 |

FOREIGN PATENT DOCUMENTS

| 62456 | 1/1987 | Japan . |
| 62457 | 1/1987 | Japan . |
| 62-99191 | 6/1987 | Japan . |

Primary Examiner—Bruce A. Reynolds
Assistant Examiner—Michael D. Switzer
Attorney, Agent, or Firm—Oblon, Spivak, McClelland, Maier & Neustadt

[57] ABSTRACT

An electrically heatable windshield comprises two glass plates bonded to each other with an interlayer therebetween and a transparent conductive layer formed at contacting surface between one of the glass plates and the interlayer so that the windshield is heated by supplying a current to the transparent conductive layer through a bus bar for feeding power. A colored layer such as a ceramic color print is formed at the peripheral portion of the surface, in contact with the interlayer, of at least one of the glass plates. The bus bar is formed on the colored layer without expanding. A transparent protective layer is formed so as to cover the edge portion of the colored layer which is near the center of the glass plates, and the transparent conductive layer is formed over the transparent protective layer.

9 Claims, 5 Drawing Sheets

ELECTRICALLY HEATABLE WINDSHIELD

BACKGROUND OF THE INVENTION

1. Field of the Invention

The present invention relates to an electrically heatable windshield having an area heating element on the surface of the glass plate for the purpose of eliminating moisture condensation, melting ice or snow deposited thereon, and for defogging or anti-fogging as well as for improving durability to a current supplied to the area heating element.

2. Description of the Related Art

There have been known various types of electrically heatable windshields having a transparent conductive layer as an area heating element on the surface of the glass plate in order to prevent moisture condensation or to melt ice or snow deposited thereon.

Figure 7:
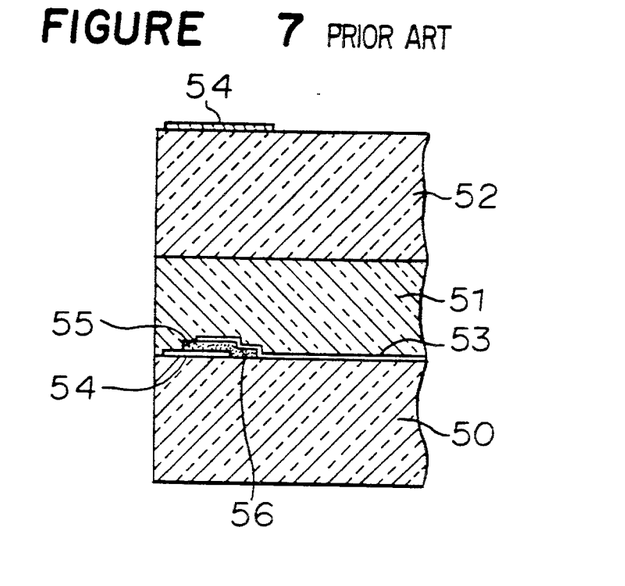
FIG. 7 is an enlarged longitudinal cross-sectional view partly broken of a conventional electrically heatable windshield in which a bus bar is partly extended from the colored layer.
Figure 8:
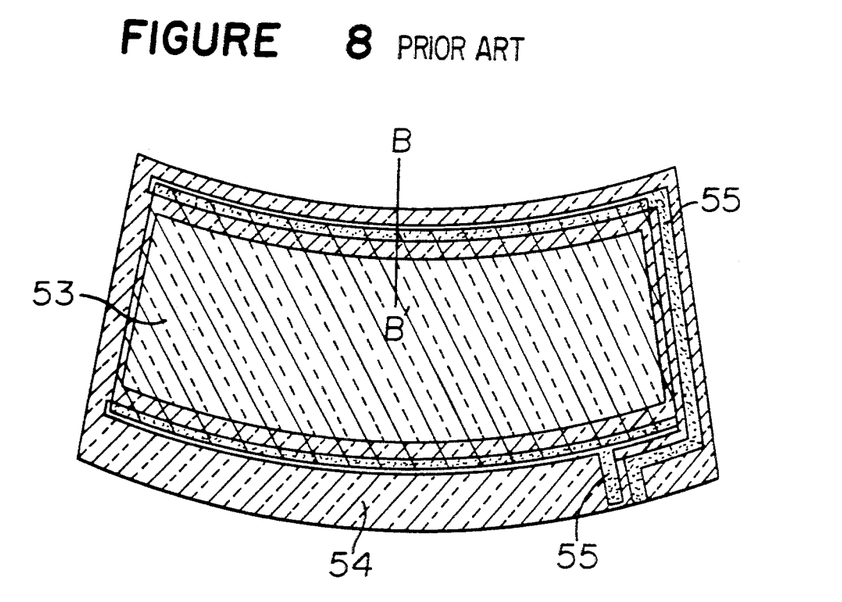
FIG. 8 is a plane view of an outer glass plate in which the bus bar is formed on a ceramic color print without expanding.
Figure 9:
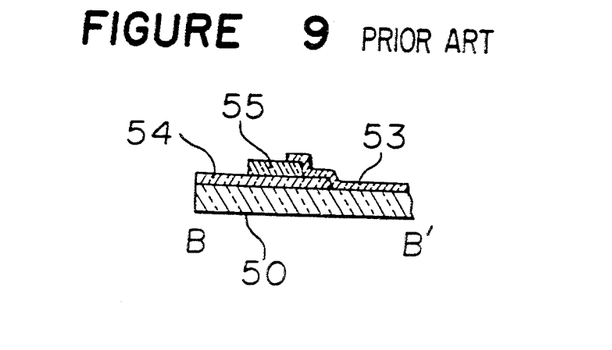
FIG. 9 is a cross sectional view taken along a line B-B' in FIG. 8.

FIG. 7 shows an example of a conventional technique. Namely, a conventional laminated glass comprises an outer glass plate 50 and an inner glass plate 52 bonded to each other through an interlayer 51 made of a material such as polyvinylbutyral, wherein a colored layer 54 for shielding is formed at the peripheral portion of the boundary surface between the outer glass plate 50 and the interlayer 51 and a transparent conductive layer 53 as an area heating element is formed at the boundary between them.

On the other hand, a bus bar 55 for supplying power is formed as a laminated layer on the colored layer 54 so that power is supplied to the transparent conductive layer 53 through the bus bar to thereby heat the glass surface.

However, since the bus bar 55 was partially extended from the colored layer 54 (i.e. an extending portion 56 was formed) as shown in FIG. 7, the breaking of a coating layer often happened at the boundary between the bus bar which was formed by printing and the transparent conductive layer 53 when a current was supplied to the bus bar.

Therefore, an improvement of the boundary has been studied. Measures to minimize the breaking of layer have been concentrated to the bus bar. For instance, there are proposals that an edge portion of the bus bar is tapered (Japanese Unexamined Utility Model Publication No. 457/1987), that the bus bar has a two-step structure at the boundary (Japanese Unexamined Utility Model Publication No. 456/1987) and that the bus bar is provided with a protective print layer (Japanese Unexamined Utility Model Publication No. 99191/1987).

Heretofore, the bus bar 55 was formed partly extended from the colored layer 54 as shown in FIG. 7. The strength of adhesion between the bus bar and the colored layer was not always sufficient. Accordingly, there was a fairly large difference of potential between them, and the breaking of layer often occurred due to the potential difference.

Techniques described in the above-mentioned publications were, therefore, proposed to improve the boundary between the bus bar 55 and the transparent conductive layer 53. Namely, these techniques provided some progress in that the boundary between the bus bar 55 and the transparent conductive layer 53 was improved, and the breaking of layer was reduced.

On the other hand, the fact that the bus bar is partially extended from the colored layer means that the color of the bus bar is visible from the outside of an automobile, this is against the standard of safety ruled by the national regulation. In the social circumstances, a demand of completely concealing the bus bar by the colored layer has been increasing.

However, in the conventional techniques (including the above-mentioned techniques even though there are some improvement), consideration that the bus bar should be entirely located on the colored layer has not been made, and it is still insufficient in the performance of the electrically heatable windshield.

Namely, as shown in a Comparative Example (FIG. 10) in which a bus bar is entirely on a colored layer in an electrically heatable windshield, when a current is supplied to the electrically heatable windshield after it has been left at a high temperature condition (80° C., 28 days), the breaking of the transparent conductive layer was resulted at the contacting portion of the colored layer to the transparent conductive layer, especially at the end portion of the colored layer which is near the center of the glass plate.

The inventors of this application examined the cause of breaking and found that the following fact. There were particles of pigment having a diameter of about 1 $\mu$m on the colored layer after the baking process. On the other hand, the film thickness of the transparent conductive layer was thin as 0.1 $\mu$m. Accordingly, the breaking of layer was resulted at the boundary between the bus bar and the transparent conductive layer. In particular, the breaking of layer was remarkable at the end portion of the colored layer which is near the center of the glass plate.

As the colored layer, a colored layer formed by a ceramic color print or formed by printing an organic series paint is used. The ceramic color print is composed of the glass frit, pigment and one or more additives. A bonding strength to glass mainly owes to the glass frit because it can be molten.

When the glass frit is baked, it is molten to exhibit a flat surface. Accordingly, the glass frit causes no problem. However, when the particle diameter of a component other than the glass frit is large or temperature of baking is insufficient, unevenness of the surface of the ceramic color print or the colored layer is large. Accordingly, irregularity in current conduction takes place at the colored layer, or a resistance between terminals by bonding the laminate glass becomes large. This creates the breaking of layer at the boundary between the colored layer and the transparent conductive layer.

SUMMARY OF THE INVENTION

It is therefore, an object of the present invention to prevent the breaking of layer by covering an uneven surface resulted by a component of pigment in the colored layer in an electrically heatable windshield in which a bus bar is formed on the colored layer.

It is an object of the present invention to provide an electrically heatable windshield capable of improving the durability to a current and having excellent performance and outer appearance.

In accordance with the present invention, there is provided an electrically heatable windshield comprising two glass plates bonded to each other with an interlayer therebetween and a transparent conductive layer formed at the contacting surface between one of the said glass plates and the interlayer so that the windshield is heated by supplying a current to the transparent conductive layer through a bus bar for feeding power, the electrically heatable windshield being characterized in that a colored layer such as a ceramic color print is formed at the peripheral portion of the surface, in contact with the interlayer, of at least one of the glass plates; the bus bar is formed on the colored layer without extending out from the edge of the colored layer; a transparent protective layer is formed so as to cover the edge portion of the colored layer which is near the center of the glass plates, and the transparent conductive layer is formed over said transparent protective layer.

DESCRIPTION OF THE PREFERRED EMBODIMENTS

Preferred embodiments of the present invention will be described.

Figure 1:
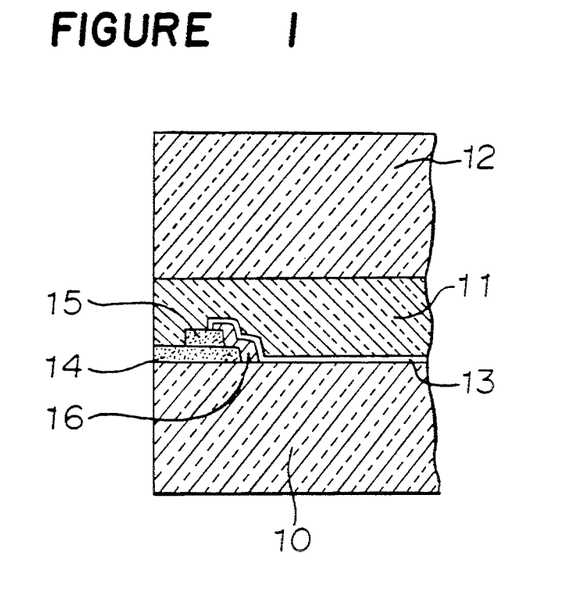
FIG. 1 is an enlarged longitudinal cross-sectional view partly broken of an embodiment of the electrically heatable windshield for an automobile according to the present invention.

In the present invention, it is preferable to form a transparent protective layer by a material having a refractive index of 2.0 or less so that the transparent protective layer 16 is not conspicuous in its outer appearance. Most preferably, the refractive index is in a range of from 1.4-1.6 so as to be close to the refractive index of glass which is used as a substrate, whereby optical interference by the protective layer is suppressed and the protective layer is not conspicuous in appearance.

The material having a refractive index of 2.0 or less may be, for instance, a single composition or a mixture of a metal oxide such as $SnO_2$ (refractive index n=2.0), $SiO_2$ (n=1.5), $ZrO_2$ (n=2.0), $In_2O_3 \cdot SnO_2$ (n=1.9), or a composite oxide comprising an oxide having a high refractive index such as $TiO_2$ (n=2.3), $Ta_2O_5$ (n=2.1) or the like and the above-mentioned oxide having a low refractive index incorporated at an appropriate proportion.

There are four methods to form the transparent protective layer 16 of the present invention.

In the first method, a mixture of glass frit and a thickening agent is coated on a glass sheet by printing and baking the mixture.

In the second method, an organic metal salt such as acetylacetonate or alkoxide, halide, acetate, nitrate or metal salt such as a chelate compound, of the metal of the metal oxide which is to be formed as the transparent protective layer 16 is dissolved in a solvent such as alcohol, an aromatic compound such as benzene or the like, or a chlorine series solvent, and thus obtained solution (hereinbelow referred to as a metal salt solution) is coated on a substrate. Then, the coated solution is thermally decomposed to thereby form a film of metal oxide.

In the third method, a solution obtained by dissolving a metal alkoxide of metal oxide by a mixed liquid of water for hydrizing the metal alkoxide and alcohol as a solvent having compatibility to the metal alkoxide and water (hereinafter, the solution is referred to as a metal alkoxide solution) is coated on a substrate, and the solution is heated and baked to thereby form a metal oxide film by a sol-gel method.

In the fourth method, a sol obtained by dispersing fine particles of a metal oxide as colloid particles in water or an organic solvent (hereinafter, referred to as a metal oxide sol) is coated on a substrate. The sol is heated and dried to thereby form a metal oxide film by a sol-gel method.

The glass frit used for the first method ma be the glass frit contained in the ceramic color print 14 and the bus bar 15. It is desirable that the melting point of the glass frit is less than a temperature suitable to bending glass (600°-640° C.) because it is necessary for the glass frit to have the melting point lower than a temperature of baking in order to form a surface which is sufficiently smooth by the baking operation.

The printing of the glass frit is conducted by a screen-printing method in the same manner as the formation of the ceramic color print or the bus bar print, and all printed layers are baked together as a preferred method.

It is preferable that the glass frit is mixed with a thickening agent and another additive if required; the viscosity is adjusted to have a viscosity such as 1,000-20,000 cp (centipoise) desired for screen printing, and a screen-printing method is employed.

Since the main component of the layer obtained by melting the glass frit is silicon oxide, the refractive index is about 1.5 and therefore, it is preferably used as the transparent protective layer of the present invention.

In the second-fourth methods, a screen printing method, a spray method, a roll coater method, a meniscus coater method, a print method, a brushing method and so on can be used to coat the metal salt solution, the metal alkoxide solution, or the metal oxide sol (including a material capable of being converted into metal oxide by baking).

Among methods using the liquid described in the second through fourth methods, the third method wherein the transparent protective layer is formed by baking the liquid including the metal alkoxide is most effective because the liquid can be coated by a simple screen-printing method. In this case, it is sufficient to adjust the metal alkoxide, if necessary, in order to obtain a desired metal oxide. And then, the transparent protective layer 16 of the present invention is preferably formed by screen-printing a liquid including a desired metal alkoxide and a thickening agent to adjust the viscosity suitable for the screen-printing, such as 1,000-2,000 cp (centipoise), followed by baking the liquid.

Further, since one edge portion of the transparent protective layer 16 is received in the gradation print of the ceramic color print, the protective layer 16 is not conspicuous in its outer appearance and therefore, there is no strange feeling.

Further, since the particle diameter of the pigment particles in the ceramic color print 14 after the baking is about 1 μm, it is necessary to completely cover the uneven surface of the ceramic color print 14 to make the surface smooth and not to be conspicuous in appearance. Accordingly, the present invention is to form the transparent protective layer 16 to have a thickness of 5 m or less, preferably 1 μm or less.

The transparent protective layer 16 as described above is firmly attached to the substrate by baking and makes the portion underlying the transparent conductive layer 13 smooth and reduces the uneven surface, the underlying portion including the boundary between the ceramic color 14 and the glass substrate, the surface of the ceramic color print 14, the boundary between the bus bar 15 and the ceramic color print 14 and a part of the bus bar. Accordingly, there is no rise in resistance in a local area even by coating the transparent conductive layer 13 having a thickness far smaller than the thickness of the ceramic color print 14, and the breaking of layer can be prevented.

Preferred embodiments of the present invention will be described with reference to the drawings.

FIG. 1 is an enlarged longitudinal cross-sectional view partly broken of an embodiment of the electrically heatable windshield of the present invention.

The electrically heatable windshield comprises an outer glass plate 10 and an inner glass plate 12 bonded to each other through an interlayer 11 made of a material such as polyvinylbutyral.

A transparent conductive layer 13 as an area heating element is formed on the contacting surface of one of the glass plates (i.e. the contacting surface of the outer glass plate 10 in FIG. 1), and a bus bar 15 for supplying power is laminated on a ceramic color print 14 for shielding without extending from the color print 14. Thus, the surface area of the electrically heatable windshield is heated by supplying power to the transparent conductive layer 13 through the bus bar.

Figure 2:
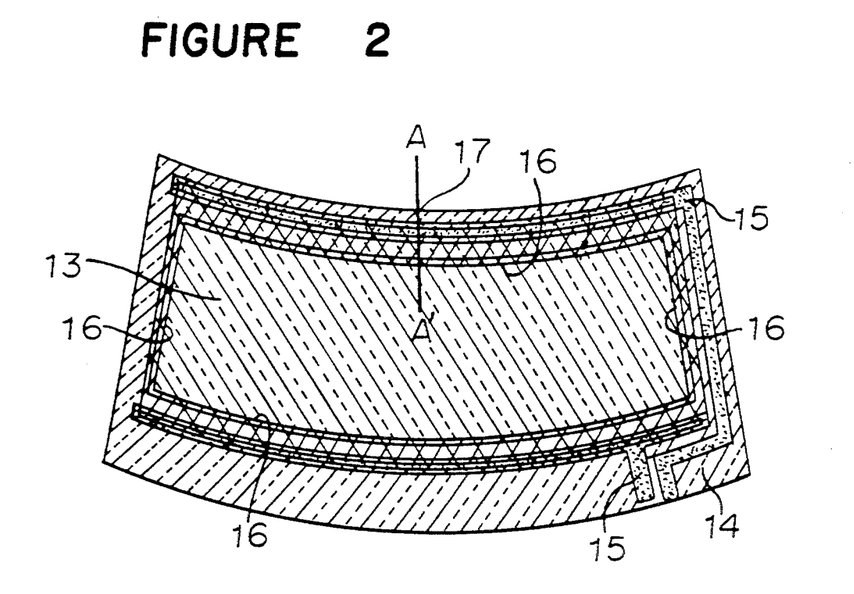
FIG. 2 is a plane view of an outer glass plate.

With respect to the boundary insertion of the transparent protective layer which is the most distinguishable feature of the present invention, it covers the end portion of the ceramic color print 14 in the vicinity of the center of the windshield, a portion of the ceramic color print 14 as an undercoat of the transparent conductive layer 13, the boundary portion between the bus bar 15 and the ceramic color print 14 and a portion of the bus bar 15 as an undercoat of the transparent conductive layer 13 to thereby make the surface portions smooth, whereby increase in resistance at a local portion which is a cause of the breaking of layer is prevented and the durability to a current is improved. For easily understanding, FIG. 2 is a plane view of the outer glass plate and FIG. 3 is a cross-sectional view taken along a line A—A' in FIG. 2.

Figure 3:
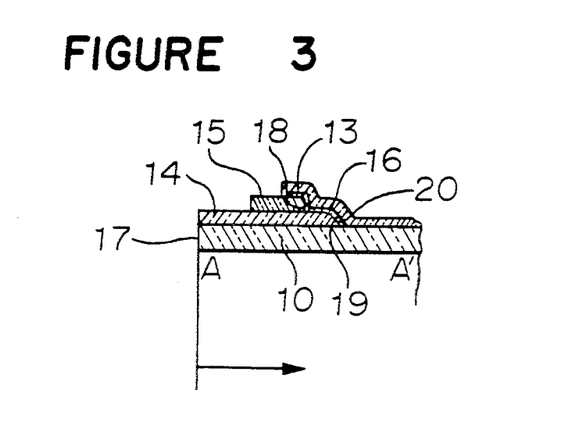
FIG. 3 is a cross-sectional view taken along a line A—A' in FIG. 2.

As shown in FIG. 3, it is desirable that a taper portion is formed at the ceramic color print at a portion near the print edge 19 of the ceramic color print 14 and the transparent protective layer 16 is formed to cover the portion of the ceramic color print.

Further, in order to effectively prevent the breaking of the transparent conductive layer, it is preferable that an edge portion 20 of the ceramic color print 14 at the surface portion thereof which faces the transparent protective layer 16 and the transparent conductive layer and in the vicinity of the center of the windshield, is tapered to thereby reduce a step.

For the bus bar 15 used for the present invention, silver paste containing silver and glass frit is preferably used. However, another material may be used as far as a sufficient effect can be obtained for the present invention.

On the other hand, for the ceramic color print 14, it may be formed by printing an ink which is obtained by formulating glass frit, a pigment such as $CuO-Cr_2O_3$, $TiO_2$, $Fe_2O_3$, $CoO$, $Cr_2O_3$ and filler such as alumina, or by another suitable method.

The most effective method of forming the protective layer is that it is coated by a screen-printing method in the same manner as that for the ceramic color print or the bus bar print and the coated layers are baked all together at the time of baking.

In order to determine the thickness of the protective layer print and in a case that the particle diameter of the pigment as a component of the ceramic color print is generally in a range of 5-15 μm and the protective layer contains pigment particles having a diameter of about 1 μm after the baking, it is desirable that the thickness of layer after the calcination is in a range of 0.01-5 μm, especially 1 μm or less to eliminate uneven surface. When the thickness is larger than 5 μm, the end portion of the protective layer becomes conspicuous which is not desired in its outer appearance. On the other hand, when the thickness is less than 0.01 μm, the uneven surface may not be sufficiently eliminated. Accordingly, the thickness should be 0.01 μm or more.

It is necessary to form the ceramic color print because it is important to conceal the bus bar laminated thereon and to improve the outer appearance. However, it is necessary to make the surface of the print smooth in order to improve the performance of electric conduction. It can be said that the thickness of the printed transparent protective layer is most desirable from the viewpoint of the above-mentioned.

For the reasons described above, the width of the printed transparent protective layer is preferably determined so that the protective layer partly enter from the edge portion 18 of the bus bar toward the edge portion of the glass plate 17 by 1-3 mm in the direction of the glass plane and it partly enters from the edge portion 19 of the ceramic color print toward the edge portion of the glass plate by 1-3 mm in the direction of the glass surface.

Although a material for the transparent conductive layer is not particularly limited, a construction that a metal oxide such as $SnO_2$, ITO, ZnO, $TiO_2$ or the like is attached to each side surface of a metal such as Ag or Au is generally used. The sheet resistance value of the transparent conductive layer is preferably 10 Ω or less. The thickness of the transparent conductive layer may be adjusted depending on the purpose of use because it depends on color tone in its outer appearance and values in spectroscopy ($T_V$, $T_E$, $R_V$, $R_E$) (generally, the thickness in total is in a range of 500-1,000 Å).

The transparent conductive layer 13 is generally attached to the contacting surface of one of the glass plates. It is preferable to form the contacting surface of the interlayer 11 facing the inner side of the outer glass plate 10 so that ice or snow depositing on the outer surface of the outer glass plate 10 can be easily molten. As a method of forming the transparent conductive layer, a vacuum deposition method, a sputtering method or another suitable method may be used.

In addition to the above-mentioned, an excellent electrically heatable windshield wherein the transparent protective layer is not conspicuous can be provided by receiving the end portion (print edge) of the transparent protective layer in the area of the gradation print of the ceramic color print.

Figure 5:
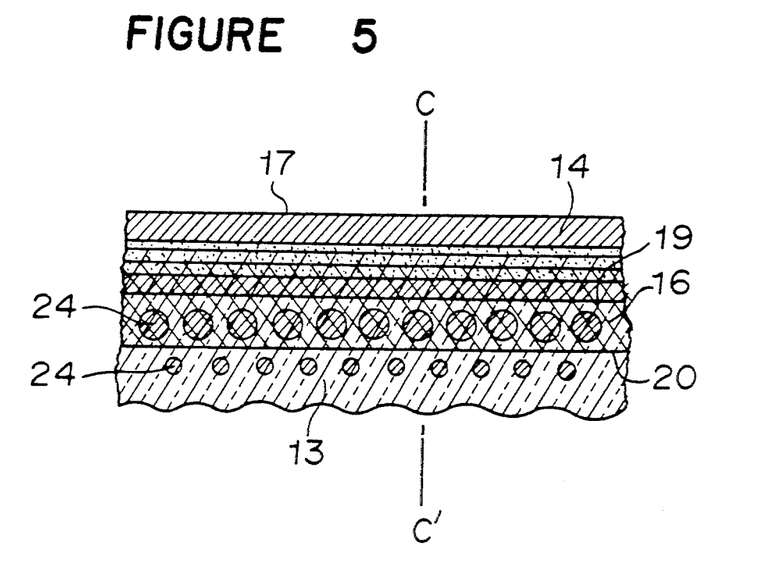
FIG. 5 is a plane view partly omitted of an embodiment of the electrically heatable windshield of the present invention in a case that the gradation print of a colored layer is formed.
Figure 6:
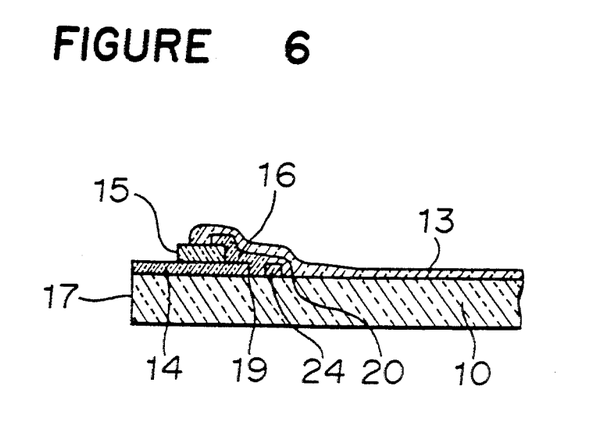
FIG. 6 is a cross-sectional view taken along a line C—C' in FIG. 5.

FIG. 5 shows an example that the transparent protective layer is received in the ceramic color print, and FIG. 6 is a cross-sectional view taken along a line C—C' in FIG. 5. In FIGS. 5 and 6, a numeral 14 designates a colored layer such as a ceramic color print, and a numeral 24 designates a gradation print of such colored layer.

FIG. 5 shows an example in which the gradation print 24 is formed in a form of dots. However, another suitable form may be used so long as the transparent protective layer looks unclearly in an area extending from the ceramic color print edge 19 in the direction of the glass surface as a whole.

The transparent protective layer 16 of the present invention covers the print edge 19 of the colored layer and to prevent the transparent conductive layer 13 from breaking. Since conductivity can be sufficiently assured at a portion of the transparent conductive layer 13 which is directly covered by the glass plates and in the vicinity of the gradation print, there is small possibility that the breaking of the layer occurs at the edge portion of the gradation print 24. Since the print edge 20 of the transparent protective layer 16 is in the gradation print 24, the transparent protective layer is not conspicuous in its outer appearance. The present invention having the above-mentioned construction can completely eliminate the breaking of layer as has happened in a conventional windshield.

EXAMPLE 1

Figure 4:
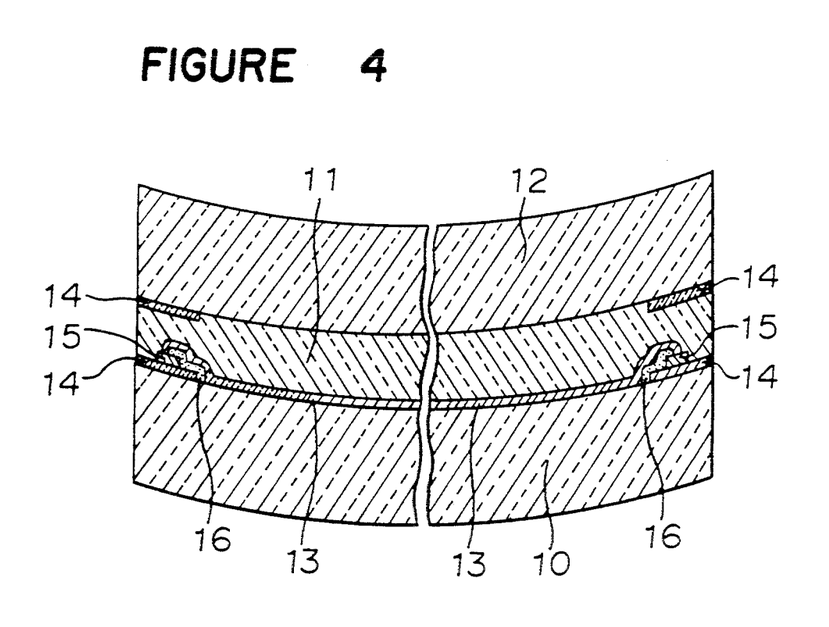
FIG. 4 is a longitudinal cross-sectional view partly omitted of an embodiment of the electrically heatable windshield of the present invention formed in accordance with Examples 1 and 2.

A ceramic color print was formed by screen-printing at the peripheral portion of an outer glass plate 50 as shown in FIG. 2, followed by predrying it. Silver paste was coated by screen-printing to form a bus bar as shown in FIG. 2, followed by predrying it. Glass frit was mixed with a thickening agent and the mixture was coated by screen-printing as shown in FIG. 4, followed by drying. Thus formed layers on the outer glass plate were baked at 630° C. An inner glass plate was overlayed on the outer glass plate 50 and a bending operation was conducted. The thickness of the ceramic color print, the thickness of the bus bar, and the thickness of the transparent protective layer on which the glass frit was melt-bonded after the baking were respectively 15 μm, 20 μm and about 1 μm. Then, a transparent conductive layer having a structure of ZnO/Ag/ZnO was formed on the outer glass plate, and it was bonded to the inner glass plate through an interlayer to thereby form a laminated glass as shown in FIG. 4. The terminal resistance between the bus bars of the laminated glass was 9.53 Ω. The laminated glass was kept at 80° C. for 30 days. The resistance of the laminated glass was measured to find 9.26 Ω and there was found neither the breaking of layer nor uneven current conduction.

EXAMPLE 2

A laminated glass was prepared in the same manner as in Example 1 except that a transparent protective layer is formed by screen-printing a sol-gel reaction liquid obtained by diluting silicon alkoxide by alcohol and containing a small amount of water to form a ceramic color print and by baking simultaneously the ceramic color print and the bus bar. The thickness of the transparent protective layer after the baking was 0.1 μm. The resistance between terminals was 11.31 Ω. The laminated glass was kept at 80° C. for 30 days. The resistance of the laminated glass was 11.54 Ω and there was found neither the breaking of layer nor uneven electric conduction.

COMPARATIVE EXAMPLE

Figure 10:
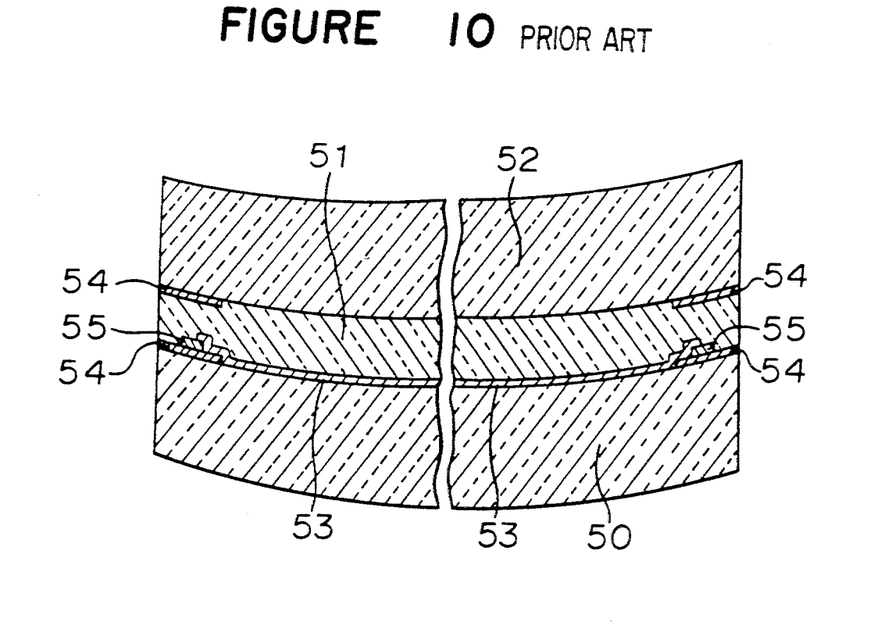
FIG. 10 is a cross-sectional view partly omitted of an electrically heatable windshield formed in accordance with Comparative Example.

A laminated glass as shown in FIG. 10 was prepared in the same manner as in Example 1 except that no transparent protective layer was formed. The initial resistance between terminals was 9.53 Ω. The laminated glass was kept at 80° C. for 30 days. The resistance after that was 11.63 Ω. When a current was supplied to the laminated glass, the breaking of layer occurred.

The electrically heatable windshield of the present invention performs the following effects.

Since a transparent protective layer covers a ceramic color print and a bus bar constituting the undercoat of a transparent conductive layer, especially an end portion of the ceramic color print near the center of a glass plate, occurrence of the breaking of layer and uneven current conduction are suppressed and increase of the sheet resistance of the transparent conductive layer at this portion can be prevented. Accordingly, increase in the resistance at a local portion is avoidable, hence the breaking of layer can be prevented even though a transparent conductive layer having a thickness extremely smaller than thickness of the ceramic color print is coated.

Further, by forming the transparent protective layer 16 by a printing method at the boundary between the bus bar 15 and the ceramic color print 14, it is very effective to prevent the breaking of layer and improvement in durability to current conduction.

Since a print edge of the transparent protective layer 16 apart from the bus bar is received in the gradation print of the ceramic color print 14, an electrically heatable windshield having good outer appearance can be provided.

Further, since the refractive index of the transparent protective layer is 2.0 or less, preferably in a range of 1.4–1.6 and it is close to the refractive index of glass which is used as a substrate, occurrence of optical interference can be reduced and an electrically heatable windshield having good outer appearance can be provided.

In addition, since the thickness of the transparent protective layer is determined to be in a range of 0.01–5 μm, particularly 1 μm or less, the portions boundary between the bus bar and the ceramic color print, the surface of the ceramic color print, the boundary between the ceramic color print and the glass plate and an undercoat portion of the transparent conductive layer are made smooth.

We claim:
1. An electrically heatable windshield comprising:
   two glass plates bonded to each other with an interlayer therebetween;

a transparent conductive layer formed at the contacting surface between one of said two glass plates and the interlayer so that the windshield is heated by supplying a current to the transparent conductive layer through a bus bar for feeding power;

a colored layer formed at the peripheral portion of the surface, in contact with the interlayer, of at least one of said two glass plates, said bus bar being formed on said colored layer without extending out from the edge of said colored layer; and a transparent protective layer formed so as to cover the edge portion of the colored layer which is nearest the center of the glass plates, said transparent conductive layer being formed over said transparent protective layer.

2. The electrically heatable windshield according to claim 1, wherein said transparent protective layer is formed of a material having a refractive index of 2.0 or lower.

3. The electrically heatable windshield according to claim 1 or 2, wherein said transparent protective layer is a metal oxide film which is formed by baking a liquid containing a material capable of forming a metal oxide by baking.

4. The electrically heatable windshield according to claim 1 or 2, wherein said transparent protective layer is a layer formed by the solidification of molten glass frit.

5. The electrically heatable windshield according to claim 1, wherein the thickness of said transparent protective layer is 5 $\mu$m or less.

6. The electrically heatable windshield according to claim 1, wherein said transparent protective layer is formed so as to cover the portion of said colored layer where said transparent conductive layer overlaps with said colored layer.

7. The electrically heatable windshield according to claim 1, wherein said transparent protective layer is formed so as to cover the portion of said colored layer and said bus bar where said transparent conductive layer overlaps with said colored layer and said bus bar except the contacting portion of said bus bar to said transparent conductive layer.

8. The electrically heatable windshield according to claim 1, wherein one end of said transparent protective layer is within a gradation print of said colored layer.

9. The electrically heatable windshield according to claim 1, wherein said colored layer is a ceramic color print.

* * * * *